US009394808B2

(12) United States Patent
Brighenti et al.

(10) Patent No.: US 9,394,808 B2
(45) Date of Patent: Jul. 19, 2016

(54) METHOD FOR OPERATING A COMBINED CYCLE POWER PLANT AND PLANT TO CARRY OUT SUCH A METHOD

(71) Applicant: ALSTOM Technology Ltd, Baden (CH)

(72) Inventors: Andrea Brighenti, Wettingen (CH); Darrel Shayne Lilley, Remetschwil (CH); Karsten Franitza, Baden (CH); Anton Nemet, Lengnau (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 521 days.

(21) Appl. No.: 13/847,171

(22) Filed: Mar. 19, 2013

(65) Prior Publication Data

US 2013/0239573 A1 Sep. 19, 2013

(30) Foreign Application Priority Data

Mar. 19, 2012 (EP) .................................... 12160146

(51) Int. Cl.
*F01K 27/00* (2006.01)
*F01K 21/00* (2006.01)
*F01K 23/10* (2006.01)
*F02C 6/18* (2006.01)

(52) U.S. Cl.
CPC ............... *F01K 21/00* (2013.01); *F01K 23/101* (2013.01); *F02C 6/18* (2013.01); *F05D 2270/083* (2013.01); *F05D 2270/0831* (2013.01); *F05D 2270/303* (2013.01); *Y02E 20/14* (2013.01); *Y02E 20/16* (2013.01)

(58) Field of Classification Search
CPC ......... F01K 21/00; F01K 23/101; F02C 6/18; F05D 2270/083; F05D 2270/0831; F05D 2270/303; Y02E 20/14; Y02E 20/16
See application file for complete search history.

(56) References Cited

U.S. PATENT DOCUMENTS

| 3,422,800 | A | | 1/1969 | La Haye | |
|---|---|---|---|---|---|
| 4,099,374 | A | * | 7/1978 | Foster-Pegg | ........... F01K 23/067 60/39.12 |
| 5,044,152 | A | * | 9/1991 | Hoizumi | ............... F01K 23/101 60/39.182 |

(Continued)

FOREIGN PATENT DOCUMENTS

| CN | 1904324 A | 1/2007 |
|---|---|---|
| CN | 101858232 A | 10/2010 |

(Continued)

OTHER PUBLICATIONS

European Search Report Nov. 7, 2012. Application No. 12160146.2-2321.

*Primary Examiner* — Jesse Bogue
(74) *Attorney, Agent, or Firm* — Buchanan Ingersoll & Rooney PC (57) ABSTRACT

Disclosed is a method for operating a gas turbine (11) comprising a compressor (14), which is equipped with variable inlet guide vanes (13) and receives at its inlet an inlet air flow, which has passed a temperature-affecting air inlet system (12*a*), a combustor (15, 15') and a turbine (16, 16'). In a closed loop control scheme, a control variable indicative of the turbine outlet temperature (TAT2) is generated, and the air inlet system (12*a*) and/or the variable inlet guide vanes (13) are controlled in accordance with said control variable such that the turbine outlet temperature (TAT2) is kept at or above a desired setting value ($TAT2_{min}$).

18 Claims, 5 Drawing Sheets

(56) References Cited

U.S. PATENT DOCUMENTS

| | | | | |
|---|---|---|---|---|
| 5,501,078 | A * | 3/1996 | Paolino | F01K 23/068 60/39.12 |
| 7,200,997 | B2 * | 4/2007 | Carlson, Jr. | F01K 21/047 60/39.55 |
| 2004/0045300 | A1 * | 3/2004 | Dovali-Solis | F02C 6/18 60/778 |
| 2007/0271929 | A1 * | 11/2007 | Berry | F01D 17/105 60/782 |
| 2008/0309087 | A1 | 12/2008 | Evulet et al. | |
| 2010/0175385 | A1 * | 7/2010 | Plant | F02C 3/10 60/773 |
| 2013/0125557 | A1 * | 5/2013 | Scipio | F02C 9/22 60/773 |

FOREIGN PATENT DOCUMENTS

| | | |
|---|---|---|
| DE | 3915478 A1 | 11/1989 |
| EP | 0718470 A2 | 6/1996 |
| EP | 2180165 A2 | 4/2010 |
| FR | 2899936 A1 | 10/2007 |
| JP | 4684968 B2 | 5/2011 |
| RU | 2067667 C1 | 10/1996 |
| RU | 101090 U1 | 1/2011 |
| SU | 1813885 A1 | 5/1993 |
| WO | 2010072710 A1 | 7/2010 |

* cited by examiner

METHOD FOR OPERATING A COMBINED CYCLE POWER PLANT AND PLANT TO CARRY OUT SUCH A METHOD

TECHNICAL FIELD

The present invention relates to the technology of combined cycle power plants. It refers to a method for operating a combined cycle power plant with an inlet temperature affecting air inlet system with variable inlet guide vanes for adjusting the inlet mass flow. It further refers to a combined cycle power plant for being used with such a method.

PRIOR ART

At part load the turbine outlet or exhaust gas temperature (TAT) of a gas turbine strongly decreases (see for example document EP 0 718 470 A2). A water/steam cycle coupled to the gas turbine in a combined cycle fashion (via a HRSG) cannot be operated effectively at a low temperature. Especially the lifetime consumption of the respective steam turbine caused by a transient cooling-down is high.

DESCRIPTION

For gas turbines with sequential combustion, a special Low Load Operation Concept (LLOC) offers the possibility to keep the entire combined cycle plant running and connected to the power grid at very low load (<25%) in emission compliance with the first combustor of the gas turbine operating in lean operation, during times of low power demand/power tariffs instead of shutting it down, with all the advantages related.

The Low Load Operation Concept
avoids frequent power plant start-stop-cycles at times during low grid demands, e.g. during the night or weekend. Avoiding start-stop cycles leads to reduced stress accumulation and lifetime consumption of major plant equipment, even for equipment which has no lifetime counter installed (heat recovery steam generator HRSG, piping, etc.); and
keeps the plant running at very low loads, allowing for very quick response to sudden power demand or increasing spark spreads (gross margin between electricity and fuel price).

The Low Load Operation Concept makes use of the shut down of the sequential (second) combustor at low part loads while firing the first combustor higher. The low load operation concept parameters are determined by GT operation parameters like compressor variable inlet guide vane (VIGV) setting and the firing temperature.

However, the known LLOCs can still result in a reduced exhaust temperatures, and typically still have some disadvantages:
High preparation time for low load operation, limiting the operational flexibility, due to the fact that the steam turbine (ST) has to be cooled down gradually to a sufficient low temperature;
impact on the Equivalent Operating Hours (EOH) of the steam turbine due to a steam temperature reduction; and
loading speed to base load limited by steam turbine stress.
The following specifications should eliminate these drawbacks:
No preparation time: the operator can activate the LLOC mode at any time required;
no EOH impact for the steam turbine, due to a lower steam temperature reduction;
fast loading/de-loading.

The use of compressor outlet gas recirculation as well as the use of an air conditioning system to control the inlet temperature of a gas turbine for anti icing operation is known for example from EP 2 180 165 A2.

Another document (JP4684968 B2) discloses a high moisture gas turbine plant, which is excellent in output and efficiency in non-rated load operation, and a respective control method. The high moisture gas turbine plant comprises a turbine, a compressor, a humidifying tower for humidifying compressed air, a regenerative heat exchanger for heating the humidified air by exhaust gas, a combustor operating with the heated air and fuel so as to generate combustion gas, a compressor inlet guide vane controlling a flow rate of combustion air, a compressor outlet pressure detector, an exhaust temperature detector, a water supply amount detector detecting the supply amount to the humidifying tower; and a control device calculating a set value of an exhaust temperature from output pressure detected by the compressor outlet pressure detector and the water supply amount detected by the water supply amount detector, so that opening of the compressor inlet guide vane is adjusted to make the exhaust temperature be close to the calculated set value, by using a function defining the set value of the exhaust temperature in partial load operation by the outlet pressure of the compressor.

SUMMARY OF THE INVENTION

It is an object of the present disclosure to provide a method for operating a combined cycle power plant CCPP.

It is another object of the disclosure to provide a CCPP for being used with the method according to the invention.

One aspect of the present disclosure is to propose a method for operation of a combined cycle power plant, which allows operation at low part load. The method is proposed for a combined cycle power plant comprising, a gas turbine with an inlet temperature affecting air inlet system for adjusting the temperature of inlet air, a compressor downstream of the inlet temperature-affecting air inlet system, for increasing the pressure of the air, and which is equipped with variable inlet guide vanes for adjusting the inlet mass flow, at least one combustor downstream of the compressor for combustion of fuel with compressed air from the compressor, and at least one turbine downstream of the combustor for expanding hot combustion gases thereby generating mechanical power. The combined cycle power plant further comprises a HRSG downstream of the gas turbine for generating live steam, a steam turbine for expanding the live steam thereby generating mechanical power, and a control system. According to the proposed method, a control variable indicative of the live steam temperature is generated in a closed loop control scheme, and the inlet temperature affecting air inlet system and/or the variable inlet guide vanes are controlled in accordance with said control variable such that the live steam temperature is kept at or above a desired target steam temperature.

According to an embodiment of the disclosed method the live steam temperature is directly measured and the measured temperature is used as the control variable.

According to another embodiment of the method the turbine outlet temperature is used as variable indicative of the live steam temperature, and the turbine outlet temperature is used as the control variable.

According to one further embodiment of this method the turbine outlet temperature is directly measured.

According to another embodiment of the method the turbine outlet temperature is calculated from an on-line heat balance calculation and used as variable indicative of the live steam temperature.

According to another embodiment of the method emissions, especially NOx, at the outlet of the gas turbine is measured and used as the control variable.

According to just another embodiment of the method a temperature is measured at other parts of the gas turbine, especially at the last stage vanes of the turbine, and this measured temperature is used as a control variable.

According to a further embodiment of the method the inlet air is heated in the inlet temperature affecting air inlet system until live steam temperature is at or above the target steam temperature. In order to carry out this method the air inlet temperature affecting air inlet system is designed to heat up the inlet air.

Especially, compressed air from a rear stage of the compressor is used to heat up the inlet air in the air inlet temperature-affecting air inlet system. A rear stage is any stage downstream of the first compressor stage. Often the stages of the second half of the compressor are referred to as rear stages. More specifically the last two or three stages of a compressor can be referred to as rear stage.

According to another embodiment of the method part of the flue gases are recirculated and admixed to the inlet air in the inlet temperature affecting air inlet system to heat up the inlet air. For flue gas recirculation the combined cycle power plant typically also comprises a flue gas splitter arranged downstream of the HRSG dividing the flue gases into a flue gas flow for disposal to the environment or further treatment and into one flue gas flow for recirculation, a control device to control the recirculated flue gas mass flow, and a re-cooler to control the temperature of the recirculated flue gas before it is mixed with fresh ambient air in the air inlet temperature-affecting air inlet system.

In yet another embodiment of the method a cooling air mass flow of the gas turbine is reduced to increase turbine outlet temperature and thus the live steam temperature. Alternatively or in combination a re-cooling temperature of a cooling air cooler is increased to increase the live steam temperature.

According to another embodiment of the method the inlet temperature-affecting inlet system is designed to cool down the inlet air. Cooling down the inlet temperature can extend the operationability at high ambient temperatures. Further, depending on the design and operating conditions the loading of a cold or warm combined cycle power plant has to be stopped at so called hold points where the gas turbine is operated for a certain time until critical components of the turbine reach threshold temperature values. After these threshold values are reached the gas turbine can be further loaded. By cooling the inlet temperature the gas turbine power at a threshold value can be increased. Due to the resulting lower steam temperature with inlet cooling it might even be possible to continue loading without delay at a threshold value. After reaching the target load or base load the steam turbine gradually heats up and a reduction in inlet cooling over time is possible until eventually the inlet cooling can be completely switched off.

According to a further embodiment of the method the inlet temperature affecting air inlet system comprises an air conditioning system for the inlet air.

According to another embodiment of the method water is injected in the inlet temperature affecting air inlet system. For this method the inlet temperature-affecting inlet system comprises a water injection system.

According to still another embodiment of the method the gas turbine is operated with sequential combustion and comprises two combustors and two turbines. In particular during operation when the inlet air temperature is increased in the inlet temperature-affecting inlet system the second combustor is not operating.

Besides the method a combined cycle power plant, which is designed to carry out such a method, is an object of the disclosure.

The disclosed combined cycle power plant comprises a gas turbine with an inlet temperature affecting air inlet system for adjusting the temperature of inlet air, a compressor downstream of the inlet temperature-affecting air inlet system, for increasing the pressure of the air, and which is equipped with variable inlet guide vanes for adjusting the inlet mass flow, at least one combustor downstream of the compressor for combustion of fuel with compressed air from the compressor, and at least one turbine downstream of the combustor for expanding hot combustion gases thereby generating mechanical power. It further comprises a HRSG downstream of the gas turbine for generating live steam, a steam turbine for expanding the live steam thereby generating mechanical power, and a control system. The control system is characterized in that, it comprises a closed loop control scheme, which is configured to generate a control variable indicative of the live steam temperature, and to control the inlet temperature affecting air inlet system and/or the variable inlet guide vanes in accordance with said control variable such that during operation of the combined cycle power plant the live steam temperature is kept at or above a desired target steam temperature. To keep the live steam temperature at or above the target steam temperature the VIGV is closed, wherein the closure of the VIGV is a function of the deviation to the target temperature. Further, to increase the steam temperature the inlet temperature can be raised and to decrease the steam temperature the inlet temperature can be reduced by inlet temperature-affecting air inlet system.

The controller of the plant has a first output connected to said inlet temperature affecting air inlet system, and a second output connected to said variable inlet guide vanes.

According to an embodiment of the disclosed gas turbine said control variable generating means comprises a temperature sensor, especially for direct measurement of the turbine outlet temperature.

According to another embodiment of the disclosed gas turbine the temperature-affecting air inlet system is designed to heat up the inlet air. Especially, compressed air from a rear stage of the compressor is fed back into the inlet temperature affecting air inlet system via a control valve, which is connected to the controller.

According to another embodiment of the disclosed gas turbine the inlet temperature affecting air inlet system is designed to cool down the inlet air. According to a further embodiment of the disclosed gas turbine the inlet temperature affecting air inlet system is designed to inject water into the stream of inlet air.

According to just another embodiment of the disclosed gas turbine the inlet temperature affecting air inlet system comprises an air conditioning system for the inlet air, which is connected to the controller.

According to another embodiment of the disclosed gas turbine the gas turbine is designed for sequential combustion and comprises two combustors and two turbines.

BRIEF DESCRIPTION OF THE DRAWINGS

Further characteristics and advantages will be more apparent from the description of a preferred but non-exclusive embodiments and with reference to the attached drawings.

DETAILED DESCRIPTION OF EXEMPLARY EMBODIMENTS

According to the disclosure, a combined cycle power plant has a closed loop control controller that adjusts the amount of air inlet cooling or air inlet heating or that regulates the inlet guide vane angle so that the live steam temperature or detected turbine outlet temperature is kept to the desired setting value.

In an embodiment, an exhaust gas temperature sensor in the turbine exhaust diffuser senses the exhaust gas temperature. A gas turbine inlet device (such as chiller, air pre-heater and/or anti-icing system) and an inlet guide vane angle actuator are used in a closed loop control scheme in order to keep the detected exhaust gas temperature to a desired setting value. The disclosed method can be used in a gas turbine plant, or in a combined cycle power plant CCPP:

Advantage:

The exhaust gas temperature of the gas turbine can be regulated to a desired value during gas turbine operation. Consequently, the exhaust gas energy of the gas turbine can be maintained to such a level that bottom cycles of the CCPP or a cogeneration plant can continue to operate without excessive live time consumption due to transient changes in the operating conditions. Preferably it can continue to operate at design (or close to design) conditions.

Figure 1:
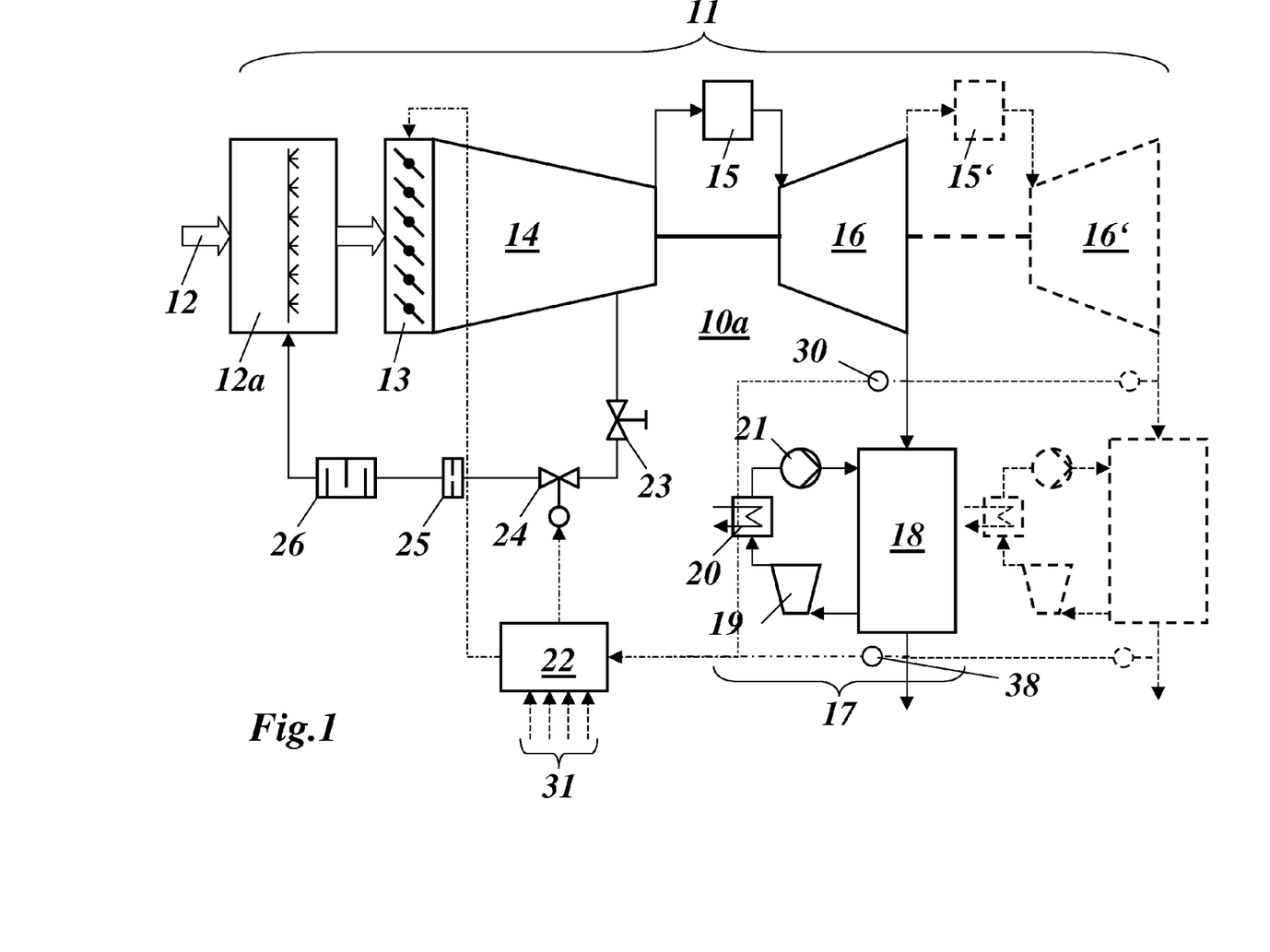
FIG. 1 shows a schematic diagram of a combined cycle power plant (CCPP) with a gas turbine according to an embodiment with a controlled inlet temperature affecting air inlet system for heating up the inlet air.

FIG. 1 shows a schematic diagram of a combined cycle power plant (CCPP) 10a with a gas turbine 11 according to an embodiment with a controlled inlet temperature affecting air inlet system 12a for heating up the inlet air. The gas turbine 11 comprises the inlet temperature affecting air inlet system 12a, which receives air 12 at its inlet, a compressor 14 with variable inlet guide vanes (VIGV) 13, a (first) combustor 15, a (first) turbine 16, and a water/steam cycle 17 with a heat recovery steam generator (HRSG) 18, a steam turbine 19, a condenser 20, and a feedwater pump 21.

The exhaust gases of the turbine 16 pass the heat recovery steam generator in order to generate the necessary steam for the water/steam cycle 17. The temperature of the exhaust gas is—in this embodiment—directly measured by means of a temperature sensor 30 at the exit of the turbine 16. Additionally the temperature of the live steam is measured with a steam temperature sensor 38. The measured TAT and/or the live steam temperature value are used as an input variable for a control 22, which controls the operation of the inlet temperature affecting air inlet system 12a and/or the variable inlet guide vanes 13.

The inlet temperature affecting air inlet system 12a receives hot compressed air extracted at a rear stage of the compressor 14. This compressed hot air is fed into the inlet temperature affecting air inlet system 12a via a shut-off valve 23, a control valve 24, an orifice 25 and a silencer 26. The control valve 24 is connected to a control output of the control 22.

As is shown in FIG. 1 (and FIGS. 2, 3, and 4) by dashed lines, the gas turbine 11 may have a sequential combustion with a second combustor 15' and a second turbine 16', which is then followed by the water steam cycle.

Figure 2:
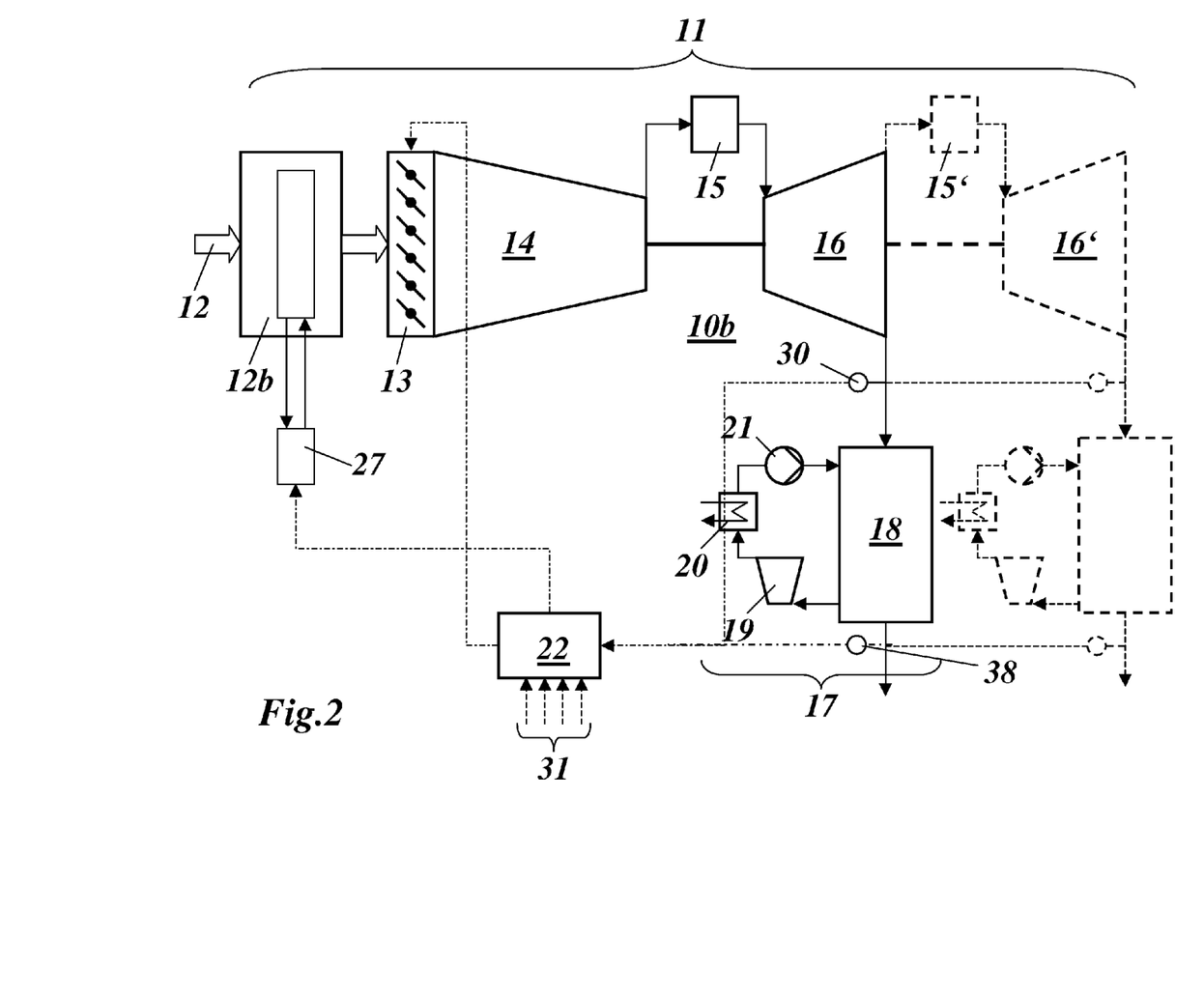
FIG. 2 shows, similar to FIG. 1, a schematic diagram of a combined cycle power plant (CCPP) with a gas turbine according to another embodiment with a controlled inlet temperature affecting air inlet system for heating air-conditioning the inlet air.

FIG. 2 shows another embodiment, with a different inlet temperature affecting air inlet system 12b, which comprises an air conditioning system 27 for affecting the temperature of the inlet air 12 before entering the compressor 14. In this case, the variable inlet guide vanes 13 and the air conditioning system 27 are controlled by the controller 22. The heat required or released by the air conditioning system 27 can be provided or used. For example a heat source or a heat sink can be provided by the water steam cycle of the plant. The released heat can for example be used to preheat water. Low-grade heat can be used as a heat source.

Figure 3:
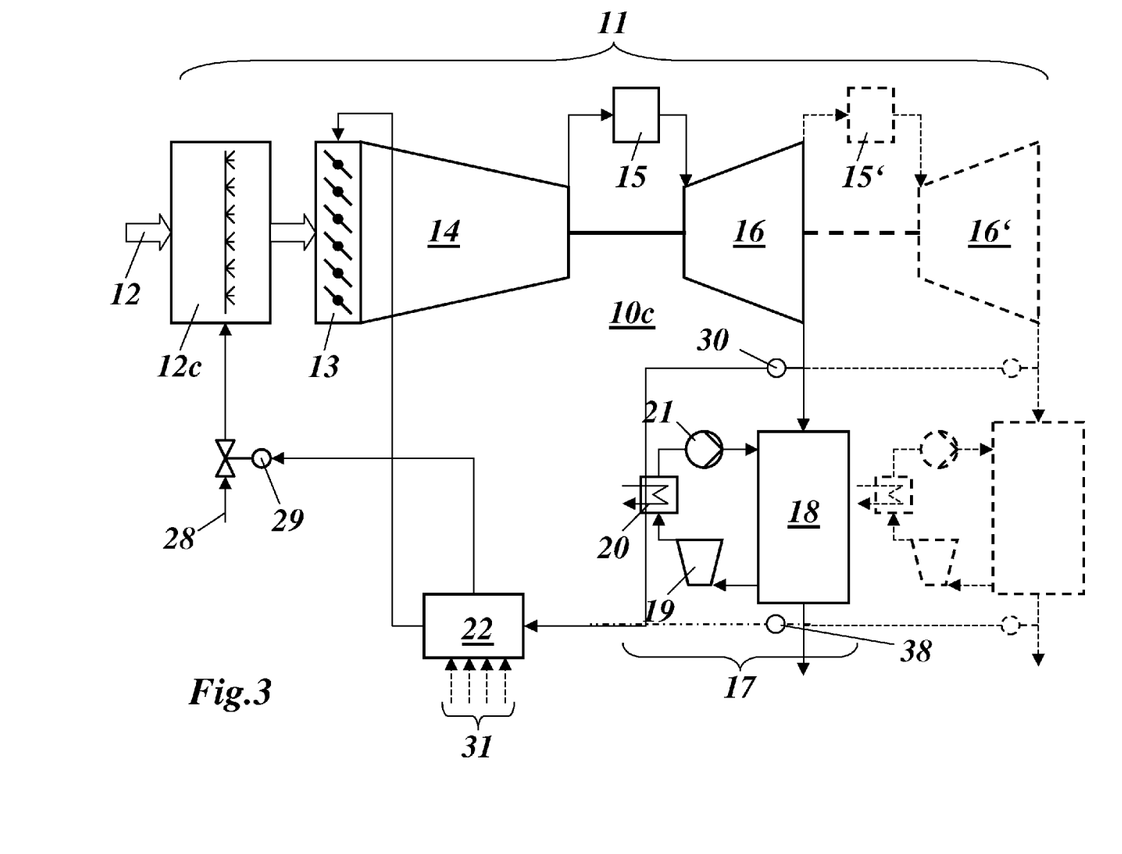
FIG. 3 shows, similar to FIGS. 1 and 2, a schematic diagram of a combined cycle power plant (CCPP) with a gas turbine according to a further embodiment with a controlled inlet temperature affecting air inlet system for injecting water into the inlet air for fogging or high-fogging.

FIG. 3 shows a further embodiment, with a different inlet temperature affecting air inlet system 12c, which comprises means for injecting water 28 into the inlet air. The amount of water injected is controlled by means of a control valve 29 being connected to a control output of controller 22. However, other control means for the water injection are possible.

The water injection may happen by means of a fogging or high fogging system, e.g. a system comprising high-pressure pumps and atomizer nozzles.

Alternatively, the inlet temperature affecting air inlet system may comprise a chilling system or an evaporative cooler system.

Figure 4:
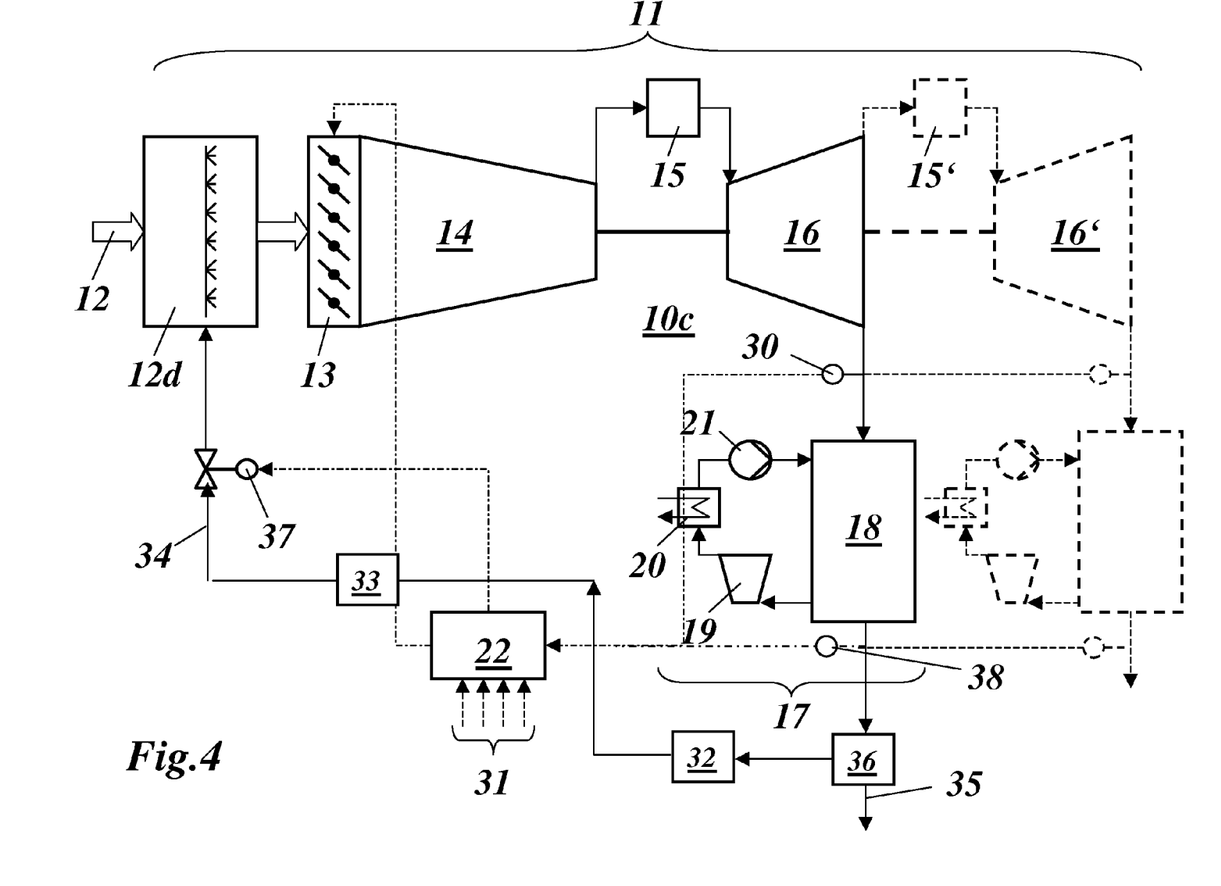
FIG. 4 shows, similar to FIGS. 1 to 3, a schematic diagram of a combined cycle power plant (CCPP) with a gas turbine according to a further embodiment with a flue gas recirculation into the inlet air for heating air-conditioning the inlet air.

FIG. 4 shows a further embodiment, with a different inlet temperature affecting air inlet system 12d, which comprises means for introducing recirculated flue gas 34 into the inlet air for heating air-conditioning the inlet air. The recirculated flue gas is branched of from the flue gas flow leaving the HRSG 18 in a flue gas splitter 36. The mass flow of recirculated flue gas 34 is adjusted by the damper or recirculation flow control valve 37. To compensate for the pressure losses of the recirculation system a blower or variable speed blower 33 may be arranged in the flue gas ducting. In this example the recirculated flue gas can be re-cooled in a flue gas re-cooler 33 to avoid large temperature inhomogeneities in the inlet air.

Alternatively, the inlet temperature affecting air inlet system may comprise an air pre-heater system with an external heat source instead of recirculating air from the compressor outlet to the compressor inlet.

In general, a closed loop control uses the exhaust gas temperature (TAT) as input to the control system and controls the gas turbine operation with optimization of the exhaust gas temperature.

The control is done by controlling at least one of the following parameters:

The position of the variable inlet guide vanes VIGV;
 md the inlet bleeding mass flow by regulating the position of a control valve 24;
 regulating the position of a control valve 29, which regulates the mass flow of air inlet cooling water 28;
 regulating the position of a control valve, which regulates the fuel mass flow injected in a combustor 15, 15' (not shown in FIG. 1-4).

Instead of measuring the TAT or live steam temperature directly (with temperature sensor 30 or 38) the control system input could also be a calculated TAT from an on-line heat balance calculation.

Alternatively, if the direct TAT measurement is not available or unusable, other indirect input variables could be used:
emissions at the gas turbine outlet (e.g. NOx), or
temperature measurements elsewhere (temperature sensor inputs 31 in FIG. 1-4), e.g. on the last stage vane of the turbine, which is normally un-cooled.

In addition to measuring the exhaust gas temperature TAT, the compressor inlet and outlet temperatures may be measured.

Further parameters of interest relate to ambient conditions (ambient temperature, ambient pressure, ambient humidity)

Other parameters are the inlet pressure drop, the water mass flow sprayed by fogging and high fogging systems, the water mass flow circulating in an evaporative cooler, the water/steam mass flow injected in the combustor 15, 15'.

EXAMPLE

An air recirculation system according to FIG. 1 (also called anti-icing) in operation during Low Load Operation has been introduced for a power plant comprising gas turbines of the type GT26. In order to reach a turbine exhaust temperature high enough to keep the CCPP in operation during low load demands without penalty (like steam turbine lifetime penalty), the anti-icing system is switched on and operates in closed loop control.

Figure 5:
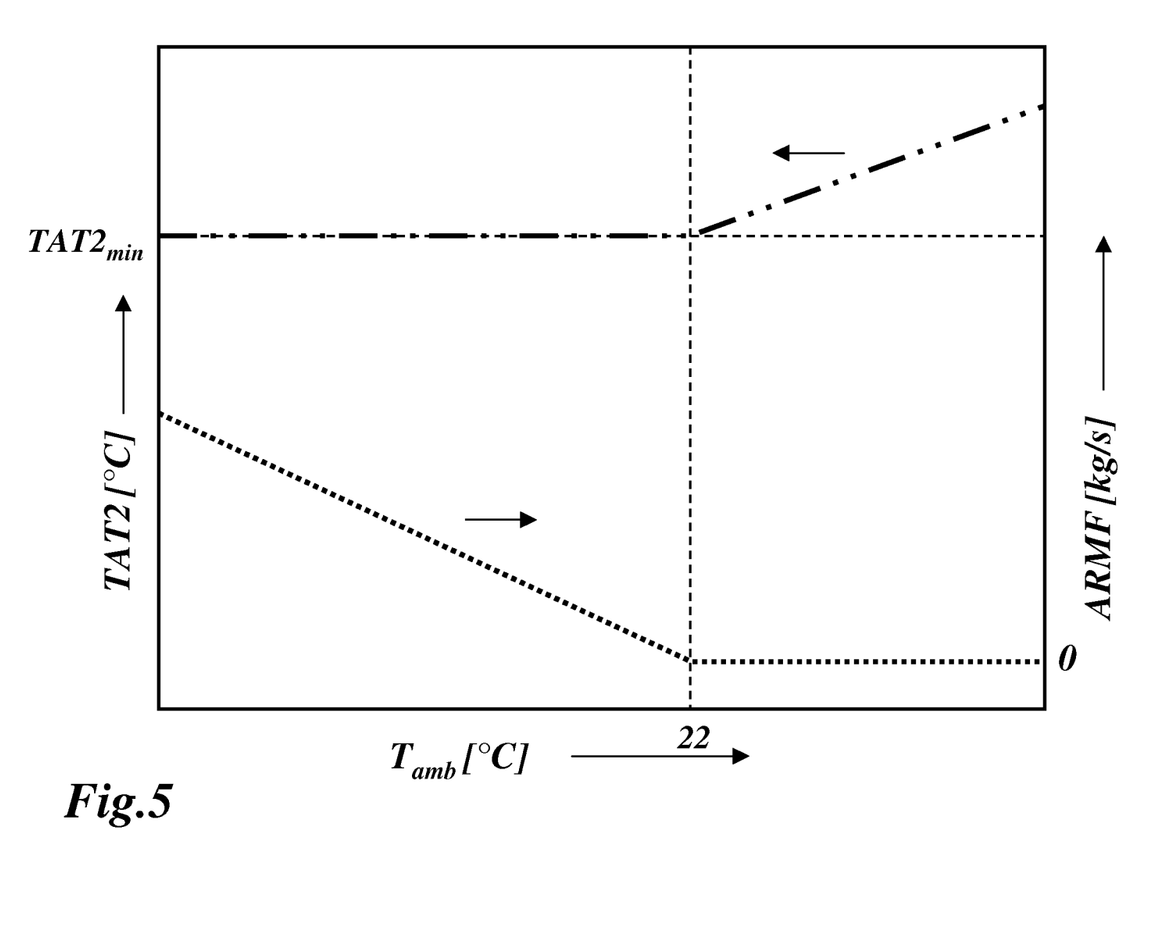
FIG. 5 shows an exemplary diagram for the control effect of the disclosed method and gas turbine.

FIG. 5 shows the expected turbine exhaust temperature TAT and the air recirculation mass flow ARMF as a function of ambient temperature Tamb during low load operation if the system is in operation. When the ambient temperature Tamb falls below a certain level (e.g. 22° C.) the corresponding decrease in turbine exhaust temperature TAT is stopped by starting and increasing the air recirculation mass flow ARMF. The concept includes also a regulation of VIGV position in order to optimize the exhaust temperature.

In a CCPP the aim is a control of the live steam temperature Tsteam. This temperature can be measured directly or controlled via the TAT.

A target temperature Tsteam,t is set for a gas turbine load and the steam temperature Tsteam is controlled by means of the variable inlet guide vanes VIGV and conditioning of the compressor inlet conditions.

The conditioning comprises at least one of:
a control of the inlet temperature;
pre-heating by means of an anti-icing system, i.e. the recirculation of compressor outlet air or extracted air (see EP 2 180 165);
pre-heating by recirculation of exhaust gas (see US 2008/0309087);
pre-heating by means of another heat source, like steam form the water/steam cycle, or the like;
cooling;
control of the inlet gas composition;
water injection or wetting At low partial load the cooling air can be reduced, thereby increasing the TAT and Tsteam.

Typically a control will be limited to a pre-heating for most operating conditions. Cooling may be necessary for example during loading of a cold plant or in certain extreme cases with very high ambient temperature.

The target value of the live steam temperature Tsteam,t can be a definite function of the load. However, Tsteam,t can also depend on a rotor or stator temperature of the steam turbine. When the rotor or stator is not yet warmed up completely, Tsteam,t may be lower. With the warming-up of rotor and stator Tsteam,t changes with time.

In an embodiment, the gas turbine control keeps the gas turbine at a minimum load, where the Tsteam,t can just be maintained.

The invention claimed is:

1. A method for operating a combined cycle power plant comprising:
a gas turbine with an inlet temperature affecting air inlet system for adjusting the temperature of inlet air, a compressor downstream of the inlet temperature affecting air inlet system for increasing the pressure of the air and which is equipped with variable inlet guide vanes for adjusting the inlet mass flow, at least one combustor downstream of the compressor for combustion of fuel with compressed air from the compressor, and at least one turbine downstream of the combustor for expanding hot combustion gases thereby generating mechanical power;
a heat recovery steam generator (HRSG) downstream of the gas turbine for generating live steam;
a steam turbine for expanding the live steam thereby generating mechanical power; and
a control system; the method comprising:
generating a control variable in a closed loop control scheme that is indicative of the live steam temperature; and
controlling the inlet temperature affecting air inlet system with said control variable such that the live steam temperature is kept at or above a desired target steam temperature.

2. The method of claim 1, wherein the live steam temperature is measured via a temperature sensor and the measured temperature is used as the control variable.

3. The method of claim 1, wherein a turbine outlet temperature is used as a variable indicative of the live steam temperature and the turbine outlet temperature is used as the control variable.

4. The method of claim 3, comprising:
directly measuring the turbine outlet temperature.

5. The method of claim 3, comprising: calculating the turbine outlet temperature from a heat balance calculation.

6. The method of claim 1, comprising:
measuring emissions at the outlet of the gas turbine such that data from the measured emissions are as the control variable.

7. The method of claim 1, wherein:
a measured temperature of at least one vane of a last stage of the turbine is the control variable.

8. The method of claim 1, comprising:
heating inlet air in the inlet temperature affecting air inlet system until the live steam temperature is at or above the target steam temperature.

9. The method of claim 8, wherein compressed air from a rear stage of the compressor is used to heat up the inlet air in the inlet temperature affecting air inlet system.

10. The method of claim 1, comprising: recirculating part of flue gases and admixing the recirculated flue gases to the inlet air in the inlet temperature affecting air inlet system to heat up the inlet air.

11. The method of claim 1, comprising:
increasing a re-cooling temperature of a cooling air cooler to increase the live steam temperature during part load operation of the gas turbine.

12. The method of claim 1, comprising:
cooling the intake air in the inlet temperature affecting inlet system to reduce the live steam temperature to a target steam temperature.

13. The method of claim 1, wherein output power of the plant is controlled by controlling the position of the variable inlet guide vanes and an inlet, temperature of the inlet air.

14. The method of claim 1, wherein the target steam temperature is determined as a function of at least one of a temperature of a steam turbine rotor and a temperature of a steam turbine stator part.

15. The method of claim 1, also comprising:
controlling the variable inlet guide vanes in accordance with said control variable in combination with the controlling of the inlet temperature affecting air inlet system such that the live steam temperature is kept at or above the desired target steam temperature.

16. The method of claim 1, also comprising:
controlling the variable inlet guide vanes in accordance with said control variable to facilitate keeping the live steam temperature at or above the desired target steam temperature.

17. A combined cycle power plant comprising:
a gas turbine with an inlet temperature affecting air inlet system for adjusting the temperature of inlet air, a compressor downstream of the inlet temperature affecting air inlet system for increasing the pressure of the air and which is equipped with variable inlet guide vanes for adjusting the inlet mass flow, at least one combustor downstream of the compressor for combustion fuel with compressed air from the compressor, and at least one turbine downstream of the combustor for expanding hot combustion gases thereby generating mechanical power;
a heat recovery steam generator (HRSG) downstream of the gas turbine for generating live steam; a steam turbine for expanding the live steam thereby generating mechanical power;
and a control system configured to generate a control variable indicative of the live steam temperature and to control the inlet temperature affecting air inlet system in accordance with said control variable such that during operation of the combined cycle power plant the live steam temperature is kept at or above a desired target steam temperature.

18. The combined cycle power plant of claim 17, wherein the control system is configured to control both the inlet temperature affecting air inlet system and the variable inlet guide vanes in accordance with said control variable such that during operation of the combined cycle power plant the live steam temperature is kept at or above the desired target steam temperature.

* * * * *